(12) United States Patent
Hirasawa et al.

(10) Patent No.: US 10,956,096 B2
(45) Date of Patent: Mar. 23, 2021

(54) PRINT MANAGER DEVICE, PRINTER, PRINT MANAGER PROGRAM

(71) Applicant: SEIKO EPSON CORPORATION, Tokyo (JP)

(72) Inventors: Masahiko Hirasawa, Yamagata-mura (JP); Kohei Iwamoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/659,210

(22) Filed: Oct. 21, 2019

(65) Prior Publication Data
US 2020/0050407 A1 Feb. 13, 2020

Related U.S. Application Data

(63) Continuation of application No. 15/793,551, filed on Oct. 25, 2017, now abandoned.

(30) Foreign Application Priority Data

Nov. 4, 2016 (JP) .............................. JP2016-215980

(51) Int. Cl.
*H04N 1/00* (2006.01)
*G06F 3/12* (2006.01)

(52) U.S. Cl.
CPC ............ *G06F 3/1205* (2013.01); *G06F 3/125* (2013.01); *G06F 3/1208* (2013.01);
(Continued)

(58) Field of Classification Search
CPC ...... G06F 3/1208; G06F 3/125; G06F 3/1205; G06F 3/1288; G06F 3/1258; G06F 3/1255
(Continued)

(56) References Cited

U.S. PATENT DOCUMENTS 8,497,998 B2 7/2013 Arai
10,144,235 B2 12/2018 Tamiya et al.
(Continued)

FOREIGN PATENT DOCUMENTS

EP 2453349 5/2012
JP 2010-027040 2/2010
(Continued)

OTHER PUBLICATIONS

European Search Report issued in EP17199994 dated Mar. 14, 2018.

*Primary Examiner* — Saeid Ebrahimi Dehkordy
(74) *Attorney, Agent, or Firm* — Workman Nydegger

(57) ABSTRACT

Systems, apparatus, and methods are provided to prevent mismatches in processing and settings related to print media. A print manager device includes a media print information storage storing media print information, which is information relating image processing information used to generate print data for a specific print medium with print settings information used to print on the print medium. The image processing information and the print settings information are relationally stored to each printer configured to print based on the print data according to the print settings information. A processor that controls communication. The processor can send the image processing information stored in the media print information storage relationally to a print medium specified by media selection information to an image processing device that generates print data and can send the print settings information stored in the media print information storage to the printer.

15 Claims, 14 Drawing Sheets

(52) U.S. Cl.
CPC .......... *G06F 3/1255* (2013.01); *G06F 3/1258* (2013.01); *G06F 3/1288* (2013.01)

(58) Field of Classification Search
USPC ........................................................ 358/1.15
See application file for complete search history.

(56) References Cited

U.S. PATENT DOCUMENTS

| | | | |
|---|---|---|---|
| 2006/0088354 A1* | 4/2006 | Lermant | ................ B41J 11/485 400/76 |
| 2009/0279115 A1 | 11/2009 | Martin | |
| 2010/0085591 A1 | 4/2010 | Arai | |
| 2010/0097649 A1 | 4/2010 | Akiyama | |
| 2015/0273903 A1* | 10/2015 | Saito | ..................... G06F 3/1224 347/16 |
| 2017/0182821 A1 | 6/2017 | Tamiya et al. | |

FOREIGN PATENT DOCUMENTS

| | | |
|---|---|---|
| JP | 2010-102398 A | 5/2010 |
| JP | 2017-120511 | 7/2017 |

\* cited by examiner

MT

| PRINTER IDENTIFIER | MEDIA INFORMATION MI | IMAGE PROCESSING INFORMATION PI | PRINT SETTINGS INFORMATION SI |
|---|---|---|---|
| AAA | aaa | | |
| | bbb | | |
| | ccc | | |
| | ⋮ | ⋮ | ⋮ |
| BBB | aaa | | |
| | bbb | | |
| | ddd | | |
| | ⋮ | ⋮ | ⋮ |
| CCC | eee | | |
| | fff | | |
| | ggg | | |
| | | | |
| ⋮ | ⋮ | ⋮ | ⋮ |

| | PRINT MODE | NUMBER OF PASSES | PRINT RESOLUTION | ICC PROFILE | COLOR CONVERSION TABLE | DOT DISTRIBUTION TABLE |
|---|---|---|---|---|---|---|
| IMAGE PROCESSING INFORMATION PI | PRINT MODE 1 | *** | *** | *** | *** | *** |
| | PRINT MODE 2 | | | | | |
| | PRINT MODE 3 | | | | | |
| | ⋮ | ⋮ | ⋮ | ⋮ | ⋮ | ⋮ |

FIG. 3

| MEDIA VENDOR | MEDIA NAME | MEDIA TYPE | MODEL | MODIFICATION DATE |
|---|---|---|---|---|
| *** | *** | *** | *** | *** |
| | | | | |
| | | | | |
| | | | | |
| | | | | |
| | | | | |
| | | | | |
| | | | | |
| | | | | |
| | | | | |
| | | | | |

Search fields: MEDIA VENDOR, MEDIA TYPE, MODEL — SEARCH (171)

| MEDIA # | MEDIA INFORMATION MI | PRINT SETTINGS INFORMATION SI |
|---|---|---|
| #1 | aaa | |
| #2 | bbb | |
| #3 | ccc | |
| ⋮ | ⋮ | ⋮ |

| PRINTER IDENTIFIER | MEDIA # | MEDIA INFORMATION MI | IMAGE PROCESSING INFORMATION PI |
|---|---|---|---|
| AAA | #1 | aaa | |
| | #2 | bbb | |
| | #3 | ccc | |
| | ⋮ | ⋮ | ⋮ |
| BBB | #1 | aaa | |
| | #2 | bbb | |
| | #3 | ddd | |
| | ⋮ | ⋮ | ⋮ |
| CCC | #1 | eee | |
| | #2 | fff | |
| | #3 | ggg | |
| | ⋮ | ⋮ | ⋮ |
| ⋮ | ⋮ | ⋮ | ⋮ |

FIG. 11

PRINT MANAGER DEVICE, PRINTER, PRINT MANAGER PROGRAM

BACKGROUND

1. Technical Field

Embodiments of the present invention relate to a print manager device and/or to a printer.

2. Related Art

In a print processing system configured to print on print media, the printing device (e.g., a printer) that executes the process of actually printing on the print media, and the image processing device that executes the process of generating the print data enabling the printer to print, are often different devices. For example, the print data is typically generated by a computer embodying the image processing device, and the printer receives the print data from the computer and executes the printing process. This type of system is widely used in the large format printer (LFP) field.

Printer driver programs that generate print data for forming images appropriately with respect to the orientation and type of print medium loaded in the paper supply device for supplying the print medium used for printing have also been developed. See, for example, JP-A-2010-102398.

In order to complete the printing process and obtain high quality printing results in this type of system, the type of print medium registered in the image processing device and the type of print medium the printer prints on must match. However, because image processing and configuring settings to match the print media are handled separately on each of these devices, there is no assurance that the image processing and configuration processes will relate to the same print medium.

SUMMARY

Embodiments of the present invention are directed to the foregoing problem, and provide a print manager device, printing device, print manager program, and image processing program that help prevent mismatched settings and processing of print media, and that enable acquiring high quality printed products.

One aspect of the invention relates to a print manager device that includes a media print information storage unit storing media print information. The media print information, for example, is information that relates image processing information required to generate print data for a specific print medium to print settings information required to print on the print medium. The media print information is stored relationally to each printer configured to print based on the print data according to the print settings information. The print manager device may also include a processor that controls communication. The processor can send the image processing information stored in the media print information storage unit relationally to a print medium specified by media selection information to an image processing device that generates print data. The processor can send the print settings information stored in the media print information storage unit to the printer.

Thus comprised, image processing information corresponding to the print medium specified by the media selection information is applied from or by the print manager device to the image processing device, and print settings information is applied to from or by the print manager device to the printer. As a result, a mismatch between the image processing information the image processing uses to generate the print data, and the print settings information the printer uses to print based on the print data (a mismatch between corresponding print media) can be easily avoided, and printouts with good quality can therefore be produced.

When the media selection information is input, the processor may send the image processing information stored in the media print information storage unit relationally to the print medium specified by the media selection information to the image processing device. The processor may also send the print settings information stored in the media print information storage unit relationally to the print medium specified by the media selection information to the printer that receives media selection information and the print data generated by the image processing device.

This configuration can reliably prevent a mismatch between image processing information the image processing device uses to generate print data, and the print settings information the printer uses to print based on print data.

In another aspect of the invention, the print settings information stored by the media print information storage unit includes print settings information after editing.

This configuration enables the user to desirably edit the print settings information stored in the media print information storage unit. The print settings information stored by the media print information may store both the unedited print settings information and the edited print settings information.

In another aspect of the invention, the print manager device may include an editing unit that receives edits of the print settings information. The print manager device can update the print settings information stored by the media print information storage unit according to the print settings information that was edited by the editing unit.

This configuration enables the user to desirably edit the print settings information stored in the media print information storage unit by operating the print manager device.

In another aspect of the invention, the processor stores the print settings information stored for each printer in the media print information storage unit in the corresponding printer.

This configuration enables the printer to configure print settings and to print on the print medium using print settings information stored on the printer.

In another aspect of the invention, the processor synchronizes the print settings information stored for each printer in the media print information storage unit, and the print settings information stored on each printer.

This configuration can match the print settings information the print manager device stores relationally to the printer, and the print settings information stored by the printer.

In this configuration, the processor synchronizes the print settings information by sending to and storing on the printer the print settings information that were edited on the media print information storage unit. Alternatively, the processor synchronizes the print settings information by acquiring the print settings information edited on the printer from the printer, and storing the edited print settings information in the media print information storage unit.

In another aspect of the invention, the media print information storage unit stores the image processing information and the print settings information relationally to each printer and to each print medium the printer can use.

When image processing information and print settings information are stored for each of a large number of print media, this configuration can appropriately store the image processing information and print settings information required for the print media used by individual printers.

In another aspect of the invention, the media print information storage unit stores the image processing information and the print settings information relationally to each printer, to each print medium the printer can use, and to each print mode that can be used for printing.

This configuration can appropriately store the image processing information and print settings information required for the specific combinations of print media and print modes each printer can use.

In another aspect of the invention, the media print information storage unit stores an identifier (such as an identification number), and the processor uses the identifier as the media selection information.

By using an identifier (identification number) when exchanging information with the image processing device and printer, the print manager device can easily and reliably identify the target print medium and supply the required information.

In another aspect of the invention, the processor can access a specific server through a public telecommunication network or other network (e.g., the Internet, LAN, WAN, or the like or combination thereof), and can acquire, and store in the media print information storage unit, the desired media print information from among the media print information the server stores for each print medium.

This configuration enables the print manager device to acquire and store, through the Internet or other public telecommunication network, the desired media print information from the media print information the server stores for a large number of types of print media.

In another aspect of the invention, the processor, when media selection information and printer selection information specifying a printer are input from the image processing device, sends image processing information to the image processing device. The image processing information is stored in the media print information storage unit relationally to the printer specified by the printer selection information and to the print medium specified by the media selection information.

When the print manager device manages multiple printers, and stores media print information for each of the multiple printers, this configuration enables the image processing information the image processing device requires to be appropriately supplied to the image processing device.

In another aspect of the invention, the print manager device is embodied on a cloud server, and communicates through a public telecommunication network or other network such as the Internet with the image processing device and printer.

Because the media print information storage unit resides on a cloud server in this configuration, the same print settings information can be easily supplied to multiple printers, and the integrity of the print settings information can be protected even when a problem occurs on a printer.

In another aspect of the invention, the print manager device and image processing device are embodied in a common housing, and communicate with the printer through a public telecommunication network or local communication connection or other network connection.

In this configuration, the print manager device and the image processing device are embodied in a single device. Furthermore, by connecting the printer to the print manager device through a local (direct) connection, the security of the printer can be improved.

The technical concept of the invention can also be embodied in forms other than a print manager device. For example, the printer described above can be an embodiment of the invention.

Another aspect of the invention is a printer that includes a processor that controls communication, and a print processing unit that prints print data using settings defined by print settings information. The print settings information is required to print on a print medium. The processor acquires media selection information specifying a print medium, and print data generated for the print medium specified by the media selection information. The processor also acquires the print settings information corresponding to the print medium specified by the media selection information. The print processing unit prints using the settings defined by the acquired print settings information.

In this configuration, the printer receives media selection information and print data generated for the print medium specified by the media selection information, and acquires print settings information corresponding to the print medium specified by the media selection information. As a result, a mismatch between the print medium to which the print data corresponds, and the print medium to which the print settings information used for printing based on the print data corresponds, does not occur, and printouts with high print quality can be produced as a result.

In another aspect of the invention, the printer also has a print settings information storage that stores the print settings information stored by an external management device. The print processing unit acquires print settings information corresponding to the print medium specified by the media selection information from the print settings information storage, and prints based on the received print data by or in accordance with the settings in the acquired print settings information.

Thus comprised, the printer configures print settings appropriate to the print medium specified by the media selection information using print settings information stored in the print settings information storage of the printer, and prints on the print medium.

In another aspect of the invention, the printer also has an editing unit that receives edits of the print settings information. The printer or editing unit may also update the print settings information stored by the print settings information storage according to the edited print settings information.

This configuration enables the user, by operating the printer, to desirably edit the print settings information stored in the print settings information storage.

In another aspect of the invention, the processor of the printer synchronizes the print settings information stored by the management device, and the print settings information stored in the print settings information storage.

This configuration can match print settings information the management device stores relationally to printers, with the print settings information stored by the corresponding printer.

The processor of the printer in this configuration can synchronize the print settings information by sending to and storing on the management device the edited print settings information in the print settings information storage. Alternatively, the processor of the printer synchronizes the print settings information by acquiring the print settings information edited on the management device from the management device, and storing the edited print settings information in the print settings information storage.

In another aspect of the invention, the processor of the printer receives print data that includes print mode selection information specifying the print mode to use when printing, and the print processing unit prints in the print mode specified by the print mode selection information.

In this configuration, the printer can print using the print settings corresponding to the print mode specified by the print mode selection information contained in the received print data.

Embodiments of the invention may include an image processing device. Embodiments of the invention may include a system including two or more of a print manager device, an image processing device, and a printer. Embodiments of the invention may also methods. The methods may include the steps executed by the print manager device, image processing device, and printer. The methods maybe embodied as programs causing the print manager device, image processing device, and printer to execute the steps. The methods may be embodied as a computer-readable, non-transitory storage medium storing the programs.

One example is a print manager program that causes a computer to execute processes related to print management, including a storage function for storing media print information, which is information relating image processing information required to generate print data for a specific print medium to print settings information required to print on the print medium, relationally to each printer in a storage unit. The processes related to print management may also include a communication control function controlling communication. The communication control function can send the image processing information to an image processing device that generates print data and can send the print settings information stored in the storage unit to the printer.

Embodiments of the invention can also include an image processing program that causes a computer to execute a process generating print data. The process of generating print data may include an acquisition function of acquiring image processing information corresponding to a specified print medium from a management device that stores image processing information required to generate print data for various print media; a print data generating function of generating print data for the specified print medium based on the acquired image processing information, and a transmission function of sending, to a printer, media selection information indicating the specified print medium, and the generated print data.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 2 illustrates an example structure of a media table.
FIG. 3 illustrates an example of the structure of image processing information.
FIG. 5 shows an example of a downloading screen.
FIG. 7 shows an example of a print settings information table on the printer.

FIG. 11 shows an example of an image processing information table of the image processing device.

DESCRIPTION OF EMBODIMENTS

Embodiments of the present invention are described below with reference to the accompanying figures. Note that the following embodiments are by way of example only and not limitation.

1. System Configuration

Figure 1:
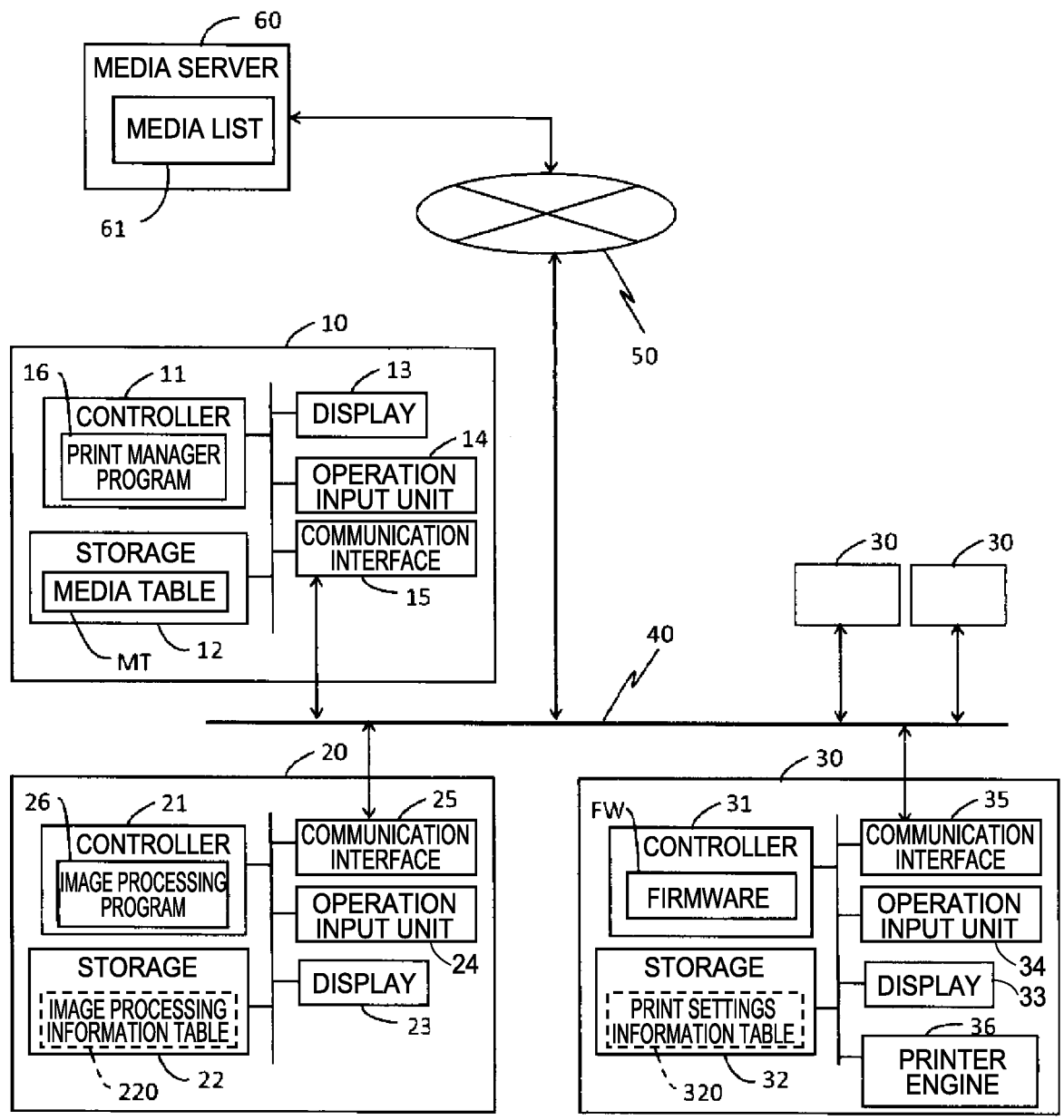
FIG. 1 is a block diagram of an example configuration of a print processing system.

FIG. 1 is a block diagram of an example configuration of a print processing system (referred to below as simply the system) 1 according to this embodiment of the invention. The system 1 may also be referred to as a print management system. The system 1 includes a print manager device 10, an image processing device 20, and a printer 30.

The print manager device 10, image processing device 20, and printer 30 are communicatively connected to each other through a wired or wireless LAN (local area network). More specifically, the print manager device 10, the image processing device 20, and the printer 30 are connected to a LAN 40 that is connected to the Internet 50, which is an example of a public telecommunication network, through a router not shown. More than one of each of these devices may be included in the system 1. More particularly, multiple printers 30 may be included in the system 1.

At least one media server 60 that stores and serves information required for operation of the system 1, such as printer 30 firmware FW and media files MF as described below, is connected to the Internet 50. The media server 60 may be configured as part of a cloud computing environment (e.g., a virtual server) that provides a cloud service through the Internet 50, or as a physical server. The media server 60 may be included in the category of a system 1.

The print manager device 10 and image processing device 20 may be embodied as a personal computer (PC) or a data terminal with the processing capacity of a PC, for example.

The print manager device 10 includes a controller 11, a storage 12, a display 13, an operation input unit 14, and a communication interface 15.

The controller 11 is configured with IC (integrated circuit) devices including a CPU (processor), ROM, RAM, or other type of memory. In the controller 11, the CPU executes operating processes according to a program using RAM as working memory to control the operation of the print manager device 10. An example of such a program is a print manager program 16. The print manager program 16 enables the controller 11 to control the print manager device 10 to execute a print manager process.

The storage 12 may be a hard disk drive, flash memory, or other storage device. The storage 12 may be part of the controller 11.

The communication interface 15 is a generic term for an interface compatible with a specific communication protocol enabling communicating with external devices through the LAN 40, for example. By working together, the controller 11 and communication interface 15 of the print manager device 10 function as a controller to control communication with external devices.

The display 13 is an example of a means for visually presenting information, and may be an LCD panel, OLED display panel, or other display device. The display 13 may include a display and a drive circuit for driving the display.

The operation input unit 14 is an example of a means for receiving user operations, and may be embodied by physical buttons, a touch panel, a mouse, or a keyboard, for example, or the like or combination thereof. If a touch panel, the operation input unit 14 may also embody a function of or may include the display 13. The display 13 and operation input unit 14 together may also be referred to as an operating panel, for example.

The image processing device 20 may include a controller 21, a storage 22, a display 23, an operation input unit 24, and a communication interface 25.

The controller 21 may be configured with IC devices including a CPU (processor), ROM, RAM, or other type of memory. In the controller 21, the CPU executes operating processes according to a program stored in memory (e.g., ROM), for example, using RAM or other working memory to control the image processing device 20. The controller 21 includes an image processing program 26 as an example of such a program. The image processing program 26 functions as a specialized RIP (raster image processor) program that generates bitmapped raster data (print data) for each color of ink used for printing by the printer 30, such as cyan (C), magenta (M), yellow (Y), and black (K). The image processing program 26 may therefore be referred to as RIP software, and the image processing device 20 running the image processing program 26 as a RIP device.

A RIP is used to produce relatively high quality printed products. For example, print data is generated by a RIP for printing by or with high quality. Print data generated by a RIP may be used, for example¥, in large format commercial printers (LFP) such as used by printing companies. The basic configuration of the storage 22, display 23, operation input unit 24, and communication interface 25 may be the same as that of the storage 12, display 13, operation input unit 14, and communication interface 15 described above. By working together, the controller 21 and communication interface 25 function as the controller of the image processing device 20 for communicating with external devices.

The printer 30 is an example of and is configured as a network printer. The printer 30 may include a controller 31, a storage 32, a display 33, an operation input unit 34, a communication interface 35, and a printer engine 36.

The controller 31 is configured with IC devices including a CPU (processor), ROM, RAM, or other type of memory. In the controller 31, the CPU executes operating processes according to firmware FW using RAM or other working memory to control operation of the printer 30. The basic configuration of the storage 32, display 33, operation input unit 34, and communication interface 35 may be the same as that of the storage 12, display 13, operation input unit 14, and communication interface 15 described above. By working together, the controller 31 and communication interface 35 function as the controller of the printer 30 for communicating with external devices.

The printer engine 36 may be a mechanism for executing the printing operation on the print medium as controlled by the controller 31. The print medium is not limited to paper. The print medium may include plastic film, fiber, and other materials to which ink or toner can adhere. In one example, the printer engine 36 is an inkjet printing mechanism that prints by ejecting ink or other fluid. The printer engine 36 may include a printhead for ejecting ink or other fluid, a carriage for moving the printhead in a specific scanning direction, a conveyance mechanism for conveying the print medium, and a heater for drying the printed medium. Note that the printing method of the printer engine 36 is not limited to inkjet, and other methods, such as electrophotographic, may be used.

The system 1 is a system in which the image processing device 20 generates print data from a user-selected image, and the printer 30 prints based on the print data on the specified print medium. Images to be printed may be text images created by a word processing program, graphic images created by a drawing program, photographs taken with a digital camera, or images read by a document scanner, for example, or combinations thereof.

2. Media Table

A media table MT is described next. As shown in FIG. 1, the print manager device 10 stores a media table MT in the storage 12. The media table MT stores information required by the image processing device 20 and printer 30 to print on print media.

FIG. 2 shows an example of the configuration of the media table MT. The media table MT is a set of media files MF compiled for each printer 30 in the system 1 that the print manager device 10 recognizes as a management target (is previously registered in the print manager device 10). For example, the system 1 in this embodiment includes multiple printers 30 identified by printer identifiers AAA, BBB, CCC. The printer identifier in this example includes the model, IP address, serial number, and firmware FW version of the printer 30. Models xxx, yyy, zzz referenced below are examples of the name of the model of the printer 30 included in the printer identifier.

A media file MF is stored for each of the print media for the printer 30 identified by printer identifier AAA in the media table MT shown in FIG. 2. The print media is identified, for example, as aaa, bbb, ccc in this example. A media file MF is also stored for each of the print media, identified as aaa, bbb, ddd, for the printer 30 identified by printer identifier BBB. A media file MF is also stored for each of the print media, identified as eee, fff, ggg, for the printer 30 identified by printer identifier CCC. In other words, for each printer 30, a media file MF for each type of print medium the printer 30 can use is stored in the media table MT. The labels aaa, bbb, ccc, ddd, and so forth are labels convenient for identifying a particular print medium, that is, identifying a particular media information MI.

One media file MF relates to one type of print medium, and is or includes information relating the media information MI to image processing information PI and print settings information SI. Thus, the information included in each media file FI and in the media table MT is stored relationally.

The media information MI includes various information related to a particular print medium. By way of example, the media information MI may include, one or more of the name of the print medium (media name), the type of material the print medium is made from (media type), the vendor that supplies the print medium to the market (media vendor), the size of the print medium (length, width, thickness), the modification date of the media file MF, and the name of the model of the printer 30 that can use the print medium or the like or combination thereof.

The image processing information PI is information required by the image processing device 20 to generate the print data for the corresponding print medium. For example, the image processing information PI may include one or more of a color profile, color conversion table, and a dot allocation table or the like or combination thereof.

The color profile may be an ICC (International Color Consortium) profile related to the color reproducibility of the corresponding print medium. An ICC profile is information enabling precise reproduction of the hue of an image on the corresponding print medium in the color conversion process of the print data generating step, and has standardized objectivity in the field of image processing.

The color conversion table may be embodied as a lookup table (LUT) used when converting the color expression of the image (such as when converting colors from an RGB (red, green, blue) color expression to a CMYK color expression), and is also defined according to the characteristics of the corresponding print medium.

The dot allocation table may be embodied as a table used in the dot distribution process that distributes the raster data obtained by the color conversion process for each ink color the printer 30 uses for printing (CMYK in this example) to dots of multiple sizes for each pixel. For example, if the printer 30 is an inkjet printer that can eject three sizes of dots (large, medium, small) having different weights of ink in each droplet, the raster data for each ink color is converted to a dot-ON value or a dot-OFF value for each of the three dot sizes.

Describing the image processing information PI even more specifically, the image processing information PI stores information for each print mode that can be selected by the user.

FIG. 3 shows an example of a structure of image processing information PI for printing on one type of print medium (in this example, a print medium referenced by media information MI aaa) in different print modes. The user can select any of multiple print modes 1, 2, 3 to print on a corresponding print medium.

The time required for printing and the print quality change according to the selected print mode may differ. In the example in FIG. 3, the appropriate number of passes, print resolution, ICC profile, color conversion table, and dot distribution table are defined in the image processing information PI for each print mode 1, 2, 3.

The number of passes is the number of times the printhead on the carriage of the printer 30 moves over a specific area of the print medium to print, and, basically, the time required to print and the print quality increase as the number of passes increases. The required ICC profile, color conversion table, and dot distribution table basically differ in each print mode, but may also be common to some print modes.

The print settings information SI is information required by the printer 30 to print on the corresponding print medium. For example, the print settings information SI includes settings such as a temperature of a heater, parameters related to print media conveyance, the print medium drying time, a platen gap, which is the height from the platen supporting the print medium to the printhead, and a cleaning frequency of the printhead nozzles, or the like or combination thereof.

By storing a media table MT as described above, the storage 12 of the print manager device 10 may also be described as a media printing information storage unit that stores, for each printer 30, media printing information (a media file MF for specific print media), which is information relating image processing information PI required to generate print data for a print medium, to print settings information SI, which is required to print on the print medium. The media table MT thus established relationships between media information MI, image processing information PI, and print settings information SI.

The media server 60 stores a media list 61 (see FIG. 1) in which a specific media file MF is registered for various print media available on the market. The media file MF for a specific print medium is created by the media vendor of the print medium, uploaded to the media server 60 through the Internet 50, and registered in the media list 61. The media vendor provides information related to the vendor's print media to the entity (media server administrator) that manages and operates the media server 60, and based on the provided information, the media server administrator may register the generated media file MF in the media list 61.

The media vendors may include the suppliers (printer vendors) that provide the printers. The media vendors and printer vendors may also be the media server administrator. There may also be as many media servers 60 as media server administrators.

A media file MF, once registered in the media list 61, may also be updated (modified) on the media server 60. For example, print media specifications, and various information for improving print quality on a print medium (image processing information PI, print settings information SI), may be changed or edited. In addition, when the firmware FW of the printer 30 is updated, the media file MF for the print media that the printer 30 can use may also need updating. When the media file MF is thus changed on the media server 60, when the change was made is also reflected in the modification date stored in the media information MI of the media file MF.

The print manager device 10 acquires the necessary media file MF from the media server 60 by the controller 11 executing the print manager program 16. More specifically, the controller 11 acquires the selected (desired) media file MF from the multiple media print information records (media file MF) stored on the media server 60, and stores the acquired media file MF in the media print information storage unit (storage 12). The controller 11 accesses the media server 60 through the communication interface 15, and makes a request, from the media server 60, for the media file MF corresponding to the print media that the printer 30 being managed can use (said printer 30 referred to for convenience as the specific printer). The media server 60 extracts the media file MF meeting the request from the media list 61, and sends the extracted media file MF through the Internet 50 (or other network) to the print manager device 10. The media file MF is thus downloaded from the media server 60 to the print manager device 10.

The controller 11 stores the downloaded media file MF relationally to the specific printer in the storage 12 (as one media file MF related to the specific printer in the media table MT). If the downloaded media file MF is not already present as a media file MF corresponding to the specific printer in the current media table MT, the downloaded media file MF is added to the media table MT relationally to the specific printer. For example, a media file MF for the printer AAA is stored relationally in the media table for the printer AAA. If a media file MF that corresponds to the same print medium as the downloaded media file MF is already stored in the current media table MT as a media file MF corresponding to the specific printer, and if the media file MF already stored in the media table MT has a modification date older than the modification date of the media file MF that was downloaded, the media file MF with the older modification date is overwritten with the downloaded media file MF.

Several examples included in this embodiment of the invention are described below based on the foregoing description.

3. Example 1

3-1. Downloading a Media File MF

Figure 4:
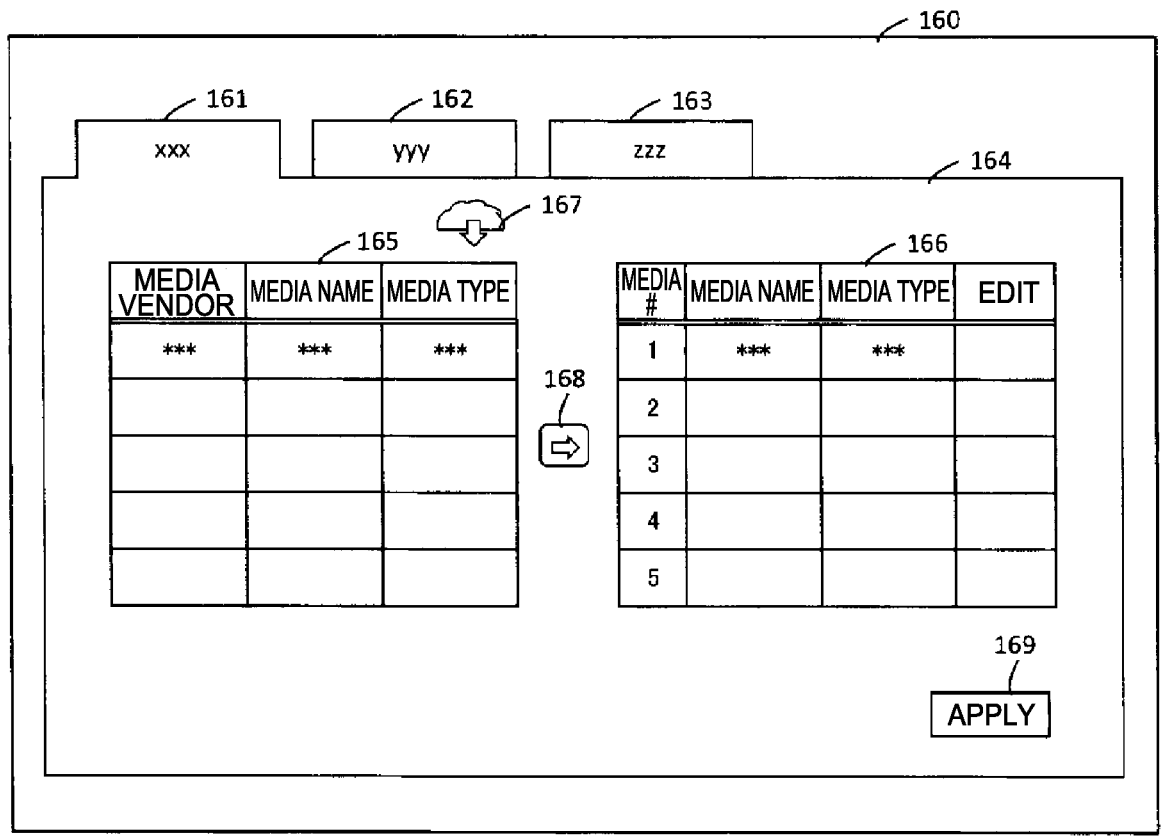
FIG. 4 shows an example of a user interface.

FIG. 4 shows an example of a user interface 160 provided by the controller 11 that runs the print manager program 16. The user interface 160 is displayed on the display 13, and the user, by operating the operation input unit 14 or by providing input into the operation input unit 14, can input to the user interface 160. Alternatively, the user interface 160 may be displayed on the display 23 of the image processing device 20 connected to the print manager device 10, and the user, by operating the operation input unit 24, can input to the user interface 160.

The user interface 160 is an example of an interface for displaying relevant information for each of multiple printers 30 managed by the print manager device 10, and for receiving input from the user. The user interface 160 in the example in FIG. 4 has three tabs 161, 162, 163 corresponding to the three printers 30 managed by the print manager device 10. The number of tabs is determined by the number of printers 30 that are managed. For ease of use, the tabs 161, 162, 163 display the name (xxx, yyy, zzz) of the printer model contained in the printer identifier of each printer 30. The printer or printers 30 may be identified in another manner. By selecting the tab corresponding to the desired printer model, the user can view a window specific to any one of the multiple printers 30 that are managed by the print manager device 10. In the example in FIG. 4, tab 161 is selected, and a window 164 containing information specific to the printer 30 corresponding to that tab 161 (printer 30 of model xxx) is opened as a result.

In the specific window 164, a first media registration list 165, a second media registration list 166, and a server access button 167 are displayed. A user wanting to acquire a media file MF from the media server 60 operates (clicks or taps) the server access button 167. When operation of the server access button 167 is detected, the controller 11 creates a new media file MF downloading screen 170 (e.g., see FIG. 5), accesses the media server 60 through the communication interface 15, and displays a media list 61 on the display 13 (or the display 23).

FIG. 5 shows an example of a downloading screen 170. In one example, the downloading screen 170 is a web page provided by the controller 11 or by the media server 60. A media list 61 of the media server 60 is displayed in the downloading screen 170. The media list 61 indicates the presence of a media file MF on the media server 60 by displaying items contained in the media information MI, such as the media vendor, media name, media type, model name (the model of printer that can use the print medium to which the media file MF applies), and modification date.

The user selects a desired media file MF from the media list 61 on the downloading screen 170, and then performs a specific operation to download the file. When the download operation is received, the print manager device 10 asserts or issues a download request specifying the media file MF to be acquired from the media server 60. The media server 60 receiving the download request then sends the requested media file MF to the print manager device 10. In the example in FIG. 4, a specific window 164 for the printer 30 of model xxx is opened, the downloading screen 170 is opened as a result of operating the server access button 167 in the specific window 164, and the user can therefore select the desired media file MF for model xxx from the media list 61 and download the file.

Note that when, as in the example in FIG. 4, a specific window 164 for the printer 30 of model xxx is opened, and the downloading screen 170 is generated as a result of operating the server access button 167 in the specific window 164, the controller 11 requests, from the media server 60, data for displaying only the media files MF corresponding to model xxx from among the media files MF on the media server 60. In response to the request, the media server 60 sends to the controller 11 data for displaying only the media files MF corresponding to model xxx from among the large number of the media files MF on the media server 60. Based on the acquired data, the controller 11 displays in the downloading screen 170 a list (a subset of the media list 61) of only the media files MF corresponding to model xxx from among the media files MF on the media server 60. As a result, the user, by selecting the desired media file MF from the media list 61 displayed in the downloading screen 170, can easily and reliably download the media files MF corresponding to model xxx.

A search tool 171 for finding a desired media file MF in the media list 61 may also be displayed in the downloading screen 170. Based on the search conditions (media vendor, media type, model name, for example) input by the user, the search tool 171 acquires, from the media server 60, data for displaying only the media files MF meeting the defined conditions. Based on the acquired data, the controller 11 then displays in the downloading screen 170 a list (a subset of the media list 61) of the media files MF meeting the search conditions input to the search tool 171 from among the media files MF on the media server 60. As a result, the user, by selecting the desired media file MF from the media list 61 displayed in the downloading screen 170, can easily and reliably download the media files MF meeting the search conditions.

The media files MF corresponding to the printer 30 (printer 30 of model name xxx) downloaded from the media server 60 to the print manager device 10 are displayed in the first media registration list 165 in the specific window 164 (FIG. 4). In the example in FIG. 4, the existence of each downloaded media file MF is displayed by presenting in the first media registration list 165 the media vendor, media name, media type or other parameters contained in the media information MI.

In the specific window 164, media files MF in the first media registration list 165 can be registered in the second media registration list 166 (FIG. 4). A media number is assigned to the print media in the second media registration list 166. The media number is, for example, a serial number starting from #1, and is a number convenient for identifying, for each printer 30, print media that are only in the system 1 including that printer 30. The media number is not downloaded from the media server 60 as part of the media information MI.

For example, the user may select the media file MF to register in the second media registration list 166 from the files in the first media registration list 165, and select the media number to associate with that media file MF (such as media number #1) in the second media registration list 166. The user then operates a copy button 168 provided in the specific window 164. In response to this operation, the controller 11 copies and displays the media file MF selected in the first media registration list 165 to the line corresponding to the media number selected in the second media registration list 166. In one example, the number of entries in the first media registration list 165 may differ from the number of entries in the second media registration list 166. The order of the entries may also differ between the two lists 165 and 166.

A first storage area and a second storage area are reserved in the storage 12 of the print manager device 10. The first storage area (the area actually storing the media files MF shown in the first media registration list 165) stores the media files MF downloaded from the media server 60. The second storage area actually stores the media files MF registered in the second media registration list 166 relationally to the corresponding media numbers. The controller 11 therefore executes a process of copying the selected media file MF stored in the first storage area, and storing the file relationally to the selected media number in the second storage area. More specifically in one embodiment, the media files MF related to a particular printer 30 are stored in the first storage area and in the second storage area for each printer 30 managed by the print manager device 10. As a result, the media files MF corresponding to each printer 30 and stored in the first storage area or second storage area are the actual content of the media table MT (FIG. 2). In another example, entries in the list may include pointers such that the media file MF is stored only a single time. Another copy of the media file MF may be generated, for example, when edited.

3-2. Editing Print Settings Information SI

The user can edit the print settings information SI of the media file MF registered in the second media registration list 166. The user selects, from the second media registration list 166, the media file MF (target file) in order to edit the print settings information SI, and executes a specific operation to start editing. In response to this operation, the controller 11 displays, on the display 13 (or display 23), an editor window 180 for editing the print settings information SI in the target file.

Figure 6:
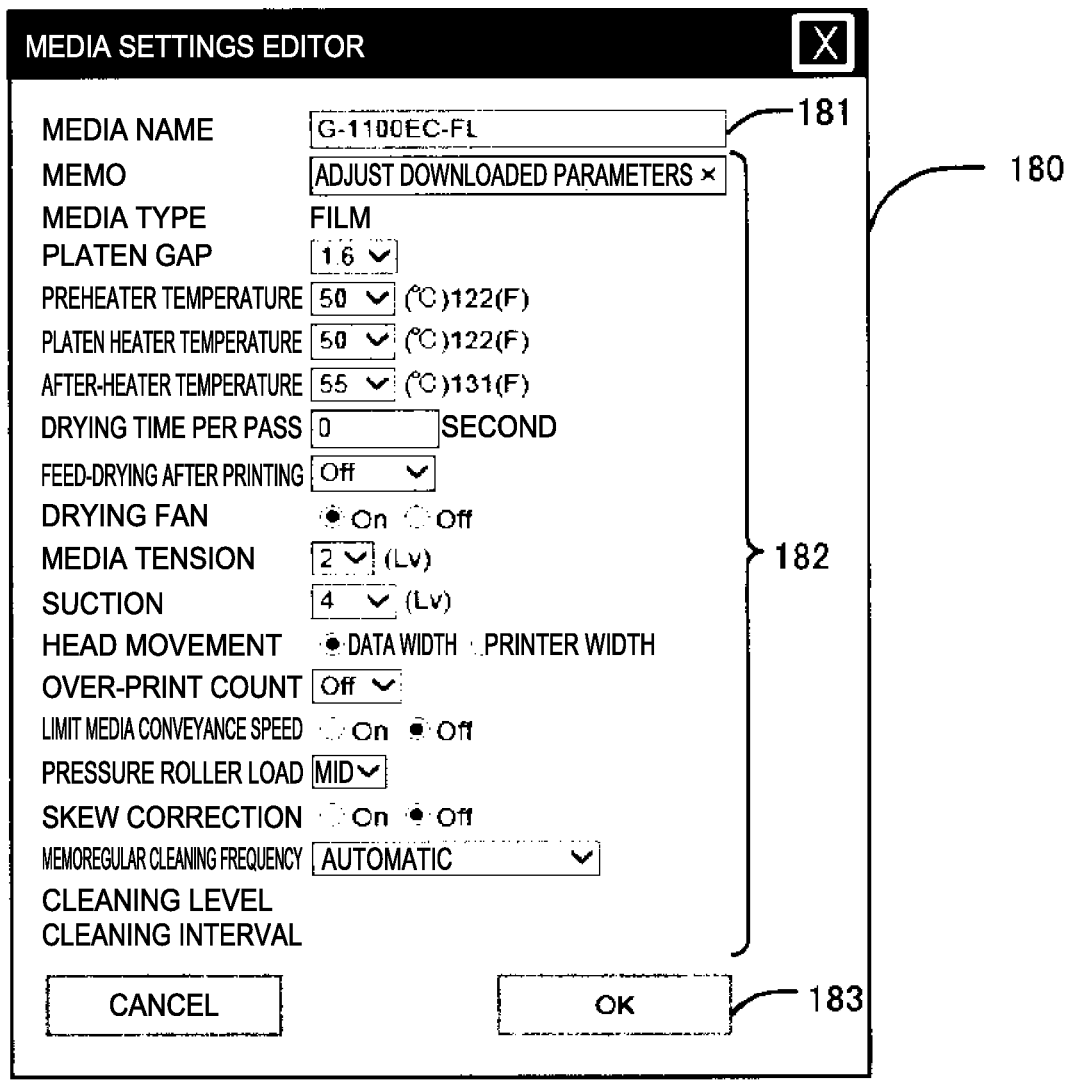
FIG. 6 shows an example of an editor.

FIG. 6 shows an example of an editor window 180. The editor window 180 may include an editable input field 181 for specific parameters, such as the media name (media setting name), in the media information MI of the target file, and editable input fields 182 for each of the editable parameters in the print settings information SI. By inputting to the appropriate editable input fields 182, the user can change (edit) the values (settings) of specific parameters. For example, the user can edit settings such as, by way of example only, one or more of the platen gap, heater temperature, parameters related to print medium conveyance, the print medium drying time, and cleaning frequency or the like or combination thereof in the current print settings information SI of the target file.

The user inputs or provides inputs to the desired editable input fields 182, and then operates an OK button 183 provided in the editor window 180. In response to operation of the OK button 183, the controller 11 stops displaying the editor window 180, and updates the print settings information SI of the target file stored in the second storage area based on the edited content of the editor window 180 when the OK button 183 was operated. As a result, the print settings information SI of the media file MF selected as the target file in the second media registration list 166 (the media file MF of media number #1 in this example) is edited. The controller 11 can therefore store the media file MF in the same state as acquired from the media server 60 by not editing the media file MF stored in the first storage area of the storage 12, and by editing only the print settings information SI of the media file MF stored in the second storage area.

The print settings information SI stored by the media print information storage unit (storage 12) can therefore be said to contain the print settings information SI after editing (post-edited print settings information SI). An original copy of the downloaded MF may also be maintained in some examples.

The controller 11, display 13, and operation input unit 14 of the print manager device 10 can also be said to embody the function of an editing unit that receives edits of the print settings information SI, and the editing unit updates the print settings information SI stored in the media print information storage unit (storage 12) based on the print settings information SI edited according to the received editing operations.

3-3. Synchronizing Printer 30 Print Settings Information SI

In this example, the print manager device 10 stores the print settings information SI of the media file MF stored in the storage 12 relationally to each managed printer 30 in the corresponding printer 30. In other words, the printer 30 has storage 32 (print settings information storage) for storing the print settings information SI stored by the print manager device 10, and the storage 32 stores a print settings information table 320 (FIG. 1) storing the print settings information SI acquired from the print manager device 10.

In this case, the controller 11 sends the print settings information SI of each media file MF stored in the second storage area of the storage 12 relationally to the managed printer 30, together with the media information MI of the media file MF, through the communication interface 15 to the printer 30. More specifically, the user operates an Apply button 169 (FIG. 4) provided in the specific window 164. In response to operation of the Apply button 169, the controller 11 sends the media information MI and print settings information SI of each media file MF currently stored in the second storage area of the storage 12 relationally to the printer 30 (printer 30 of model name xxx in this example) to which the specific window 164 with the Apply button 169 corresponds, to that printer 30 (that is, printer 30 of model name xxx in this example). As previously stated, the media file MF in the second storage area may include edits and may be different from the corresponding media file MF stored in the first storage area.

FIG. 7 shows an example of the print settings information table 320 stored in the printer 30. The controller 31 of the printer 30 stores, in the print settings information table 320 of the storage 32, the combination of print settings information SI and media information MI sent from the print manager device 10 for each print medium that can be used. As described above, the media information MI in this example may include information such as the media name, media type, media vendor, print medium size, media file MF modification date, and the model name of the printer 30 that can use the print medium. However, all of this media information MI does not need to be stored in the print settings information table 320. In one example, the print settings information table only needs to store information sufficient to identify the print medium with a 1:1 relationship to print settings information SI.

In addition to media information MI for each print medium, the media numbers applicable only in the system 1 of the specified printer 30 is stored in the print settings information table 320 in this example (FIG. 7). In other words, when the Apply button 169 is operated, the controller 11 sends the media numbers, media information MI, and print settings information SI of the media file MF currently stored in the second storage area relationally to the printer 30 to which the specific window 164 with the Apply button 169 corresponds, to that printer 30. However, the media number is not essential, and any information able to identify a print medium, such as the media name, may be used.

The content of the print settings information SI for each print medium the printer 30 stores in the storage 32 (print settings information table 320) preferably matches the print settings information SI on the print manager device 10 side. The controller 11 therefore synchronizes the print settings information SI stored for each printer 30 in the storage 12 with the print settings information SI stored by each printer 30. As described above, when the Apply button 169 is operated, the controller 11 sends the print settings information SI of each media file MF currently stored in the second storage area of the storage 12 relationally to the printer 30, to which the specific window 164 having the Apply button 169 corresponds, to that printer 30. When the print settings information SI of the target file (media file MF) stored in the second storage area for a particular printer 30 is edited as described above through the editor window 180, the print settings information SI that is then sent to that printer 30 is, naturally, the print settings information SI after editing was completed.

In other words, by sending and storing in the printer 30 the post-edited print settings information SI in the storage (second storage area) of the print manager device 10, the controller 11 can be said to have synchronized the print settings information SI on the print manager device 10 and printer 30. When the combination of print settings information SI and media information MI (and media number) corresponding to the print media usable by the printer 30 is received by the printer 30 from the print manager device 10, if print settings information SI corresponding to the same media information MI (and media number) as the received print settings information SI is already stored in the print settings information table 320, the received print settings information SI is written over the print settings information SI corresponding to the same media information MI (and media number). In other words, the print settings information SI is overwritten when new print settings information SI is received. If an entry is not present in the print settings information table 320 for print settings SI received from the print manager device 10, an entry is created as necessary.

In the process of the print settings information SI being sent from the print manager device 10 to the printer 30, from the perspective of the printer 30, the controller 31 may be said to synchronize the print settings information SI stored in the print manager device 10 with the print settings information SI stored in the storage 32 (print settings information table 320). In other words, the controller 31 may be said to synchronize the print settings information SI by acquiring the post-editing print settings information SI from the print manager device 10 and storing the acquired print settings information SI in the storage 32 (print settings information table 320).

Note that when the OK button 183 of the editor window 180 is operated and the Apply button 169 of the specific window 164 is then operated, the controller 11 may simultaneously update the print settings information SI of the target file (media file MF) stored in the second storage area based on the edited content from the editor window 180 at the time the OK button 183 was operated, and send the updated (post-edited) print settings information SI to the corresponding printer 30. This configuration enables edits of the print settings information SI on the print manager device 10 to be immediately reflected in the print settings information SI stored on the printer 30 side.

The process of downloading media files MF through a special window of the user interface 160, correlating the downloaded media file MF to a media number, editing the print settings information SI, and sending the print settings information SI to the printer 30 (synchronizing the print settings information SI) as described above is the same when the tab 162, 163 (FIG. 4) for another printer 30 (a printer 30 of model name yyy or zzz) managed by the print manager device 10 is selected. The controller 11 may also regularly check by communicating with the media server 60, to determine if a media file MF for print media usable by a managed printer 30 has been newly registered or updated in the media list 61 of the media server 60. Based on the result of this check, the controller may automatically download relationally to the printer 30 media files MF that have not been downloaded from the media server 60.

The printer 30 is not limited to being a passive recipient of edited and synchronized print settings information SI. The controller 31 may also receive, in response to a specific operation of the operation input unit 34, requests for selected edits of print settings information SI stored for a specific print medium (media information MI) in the print settings information table 320. In other words, the process of editing print settings information may be initiated at the printer 30. When such an edit request is received, the controller 31 may, for example, display an editing screen (printer-side editor) on the display 33 that is functionally comparable to the editor window 180 described above. The controller 31 then receives, through the printer-side editor displayed on the display 33, desired edits of the selected print settings information SI based on user operation of the operation input unit 34.

After inputting as desired to the printer-side editor, the user operates an OK button presented in the printer-side editor, for example. In response to operation of the OK button, the controller 31 stops displaying the printer-side editor, and updates the selected print settings information SI stored in the print settings information table 320 according to the edited content on the printer-side editor at the time the OK button was operated. As a result, the desired print settings information SI selected by the user for editing in the print settings information table 320 of the printer 30 can be edited.

The controller 31, display 33, and operation input unit 34 of the printer 30 can thus also be said to embody the function of an editing unit that receives edits of the print settings information SI, and the editing unit updates the print settings information SI stored in the print settings information table 320 stored by the print settings information storage (storage 32) based on the print settings information SI edited according to the received editing operations.

When print settings information SI in the print settings information table 320 is edited through the printer-side editor as described above, the printer 30 sends the post-edited print settings information SI with the media information MI (and or media number) through the communication interface 35 to the print manager device 10. In other words, the controller 31 synchronizes the print settings information SI by sending the post-edited print settings information SI from the print settings information storage (storage 32) to the print manager device 10. When a combination of media information MI (and/or media number) and print settings information SI is received from the printer 30 on the print manager device 10 side, the print manager device 10 writes the received print settings information SI over the print settings information SI stored in the second storage area of the storage 12 relationally to the printer 30 and the media information MI (and/or media number). From the perspective of the print manager device 10, the controller 11 may be said to synchronize the print settings information SI by acquiring the print settings information SI edited on the printer 30 from the printer 30, and storing the received print settings information SI in the media print information storage unit (storage 12).

The print settings information SI can thus be edited on either the print manager device 10 or printer 30, and the edited results can be synchronized between the devices, in this example of the invention. As a result, usability is improved for users that want to edit printer 30 settings for specific print media.

3-4. Print Data Generating Process of the Image Processing Device 20

The operation of the image processing device 20 in the system 1 is described next.

Figure 8:
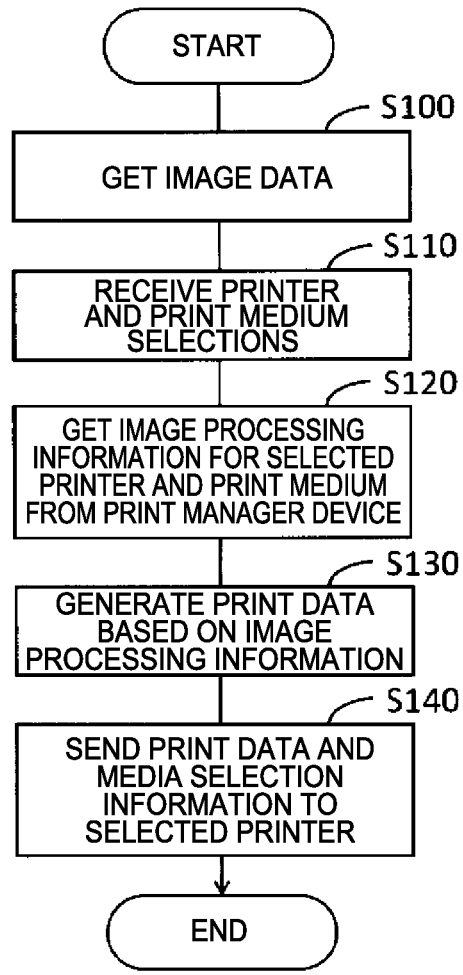
FIG. 8 is an example flow chart of a print data generating process of the image processing device.

FIG. 8 is an example of a flow chart of the print data generating process embodied by or performed by the controller 21 of the image processing device 20 running the image processing program 26.

The controller 21 first acquires, in response to a user operation, image data indicating the image to print (step S100). The image data acquired here may be image data created by a program installed on the image processing device 20, such as image data created by a word processing program or drawing program, or image data input from a digital camera, document scanner, or other PC, or the like or combination thereof, for example.

The controller 21 receives a command specifying the printer 30 to execute the printing process and the print medium to use for printing (step S110). The controller 21 may query the print manager device 10 through the communication interface 25 for the managed printers 30 and the print media each printer 30 can use. The controller 11 of the print manager device 10 that receives the query from the image processing device 20 then sends the printer identifier for each managed printer 30, and the media information MI of the media files MF relationally stored for each printer 30 in the storage 12 (second storage area) through the communication interface 15 to the image processing device 20 that sent the query. At this time the controller 11 may send, in addition to the printer identifier of each printer 30, and the media information MI of the media files MF relationally stored for each printer 30 in the storage 12 (second storage area), the media numbers of the media files MF relationally stored for each printer 30 to the image processing device 20. Below, the media information MI and media number related to a print medium is simply referred to as the media information MI.

Based on the printer identifier of each printer 30 and the media information MI related to each printer 30 sent from the print manager device 10 as described above, the controller 21 generates and displays on the display 23 a user interface (print conditions input interface) for inputting the printer 30 and print medium selections. Based on the printer identifier of each printer 30, for example, the print conditions input interface may display for each printer 30 the model name, IP address, serial number, firmware version, or other information or the like or combination thereof. Based on the media information MI related to each printer 30, the print conditions input interface may also display information about the print media each printer 30 can use (such as the media name, media type, media vendor, media number). By looking at the print conditions input interface, the user can therefore know what printers 30 can be selected and what print media can be selected for each printer 30. Once the user selects a printer 30 from the print conditions input interface by operating the operation input unit 24, the user can select the print medium from the print media that can be used by the specified printer 30. The controller 21 receives these selections.

Once the printer 30 and print medium selections are received, the image processing device 20 acquires from the print manager device 10 the image processing information PI corresponding to the specified printer 30 and print medium (step S120).

In this case, the image processing device 20 sends the printer selection information specifying the printer 30 and media selection information specifying the print medium through the communication interface 25 to the print manager device 10. The print selection information may be any information uniquely identifying the printers 30 managed by the print manager device 10, such as the model name of the printer 30. Alternatively, if the multiple printers 30 managed by the print manager device 10 include multiple printers 30 of the same model, the printer selection information may include a combination of the model name, IP address, and serial number, for example.

The media selection information may be any information uniquely identifying the print media usable by the selected printer 30, such as the media name. In this example, a simple media number is used as the media selection information. When the controller 21 displays the print conditions input interface in step S110 as described above, the media information MI for each print medium has already been acquired from the print manager device 10, and the media number is included in the media information MI. For example, suppose the user specified, through the print conditions input interface, a printer 30 of model name xxx, and specified the print medium of media number #1 from among the multiple print media the printer 30 of model name xxx can use. In this case, the image processing device 20 sends printer selection information specifying a printer 30 of model name xxx, and media selection information (for media number #1) to the print manager device 10.

The controller 11 of the print manager device 10 to which the printer selection information and media selection information was input from the image processing device 20 then reads the image processing information PI from the media file MF stored in the storage 12 (second storage area) relationally to the printer 30 specified by the printer selection information and the print medium specified by the media selection information. The controller 11 then sends the read image processing information PI through the communication interface 15 to the image processing device 20 that sent the printer selection information and media selection information. As a result, the image processing device 20 acquires the image processing information PI required to generate print data appropriate to the specified printer 30 and print medium.

Next, the controller 21, based on the acquired image processing information PI, generates print data for the specified print medium (step S130).

In this case, by applying an imaging process based on the image processing information PI to the acquired image data, the controller 21 generates raster data (print data) for each color of ink (such as CMYK) used by the specified printer 30 to print. For example, the controller 21 may apply to the image data a resolution conversion process according to the print resolution contained in the image processing information PI, a color conversion process using the color conversion table, color matching using a color profile, a dot distribution process using a dot distribution table, and a data sorting process according to the number of processes, and generate print data in the format ultimately supplied to the printer 30.

As described above, the image processing information PI may include information for different print modes (FIG. 3). When the image processing information PI includes information for different print modes, the controller 21 may display a user interface for selecting the print mode on the display 23, and may receive the print mode selected by the user operating the operation input unit 24. The controller 21 then generates print data based on the number of passes, print resolution, color profile, color conversion table, dot distribution table, and other image processing information PI corresponding to the selected print mode. In other words, print data optimized for the combination of printer 30, print medium, and print mode specified as desired by the user can be generated. A user may not provide input for all settings and some settings may be selected automatically or by default. Some default settings may be based on other settings.

The controller 21 sends the print data generated as described above with the media selection information specifying the print medium through the communication interface 25 to the specified printer 30 (step S140). Of course, the media selection information sent with the print data in step S140 is information indicating the print medium selection received in step S110 (in this example, the media number), and the printer 30 to which the information is sent in step S140 is the printer 30 specified by the information received in step S110.

Sending the media selection information with the print data includes, for example, sending the media selection information attached or linked to the print data, or sending the media selection information embedded in the print data. The media selection information may be included in a header, a file, or the like. Note that when a print data selection is received as described above when generating print data, the controller 21, in step S140, may send print mode selection information specifying the selected print mode. That is, the print mode to use for printing may also be sent with (attached, linked, embedded, etc.) with the print data to the printer 30. The print mode selection information is information including specific print mode content, such as the number of passes.

3-5. Printing Process of the Printer 30

Figure 9:
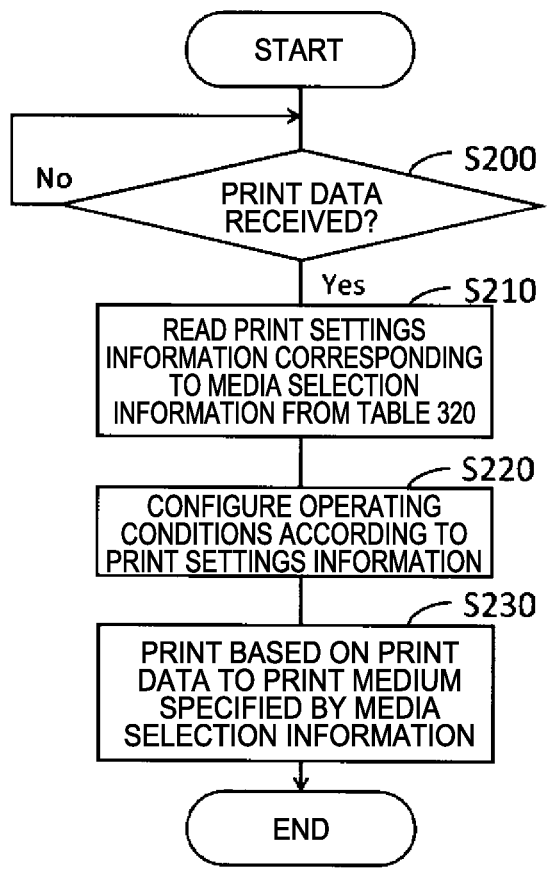
FIG. 9 is an example flow chart of a printing process of the printer.

FIG. 9 is an example of a flow chart of the printing process the controller 31 of the printer 30 executes according to firmware FW.

The controller 31 determines whether or not print data was received through the communication interface 35 from an external device (step S200). If print data was received (step S200: Yes), the process goes to step S210. The printer 30 receives the print data generated for the print medium specified by the media selection information, and the media selection information, that the image processing device 20 sent as described above.

In step S210, the controller 31 acquires the media selection information included or sent with the print data, and reads the print settings information SI corresponding to the media selection information (media number) from the print settings information table 320 of the storage 32. In other words, because the printer 30 in this first example stores a print settings information table 320, the print settings information SI required for the printing process can be acquired without accessing the print manager device 10 each time in order to execute the printing process based on the print data.

Next, the controller 31 sets the operating conditions for parts of the printer engine 36 according to the print settings information SI read in step S210 (step S220). Based on the print settings information SI that was read, the controller 31 configures such parameters as the heater temperature, print medium conveyance by the conveyance mechanism, the print medium drying time, platen gap, and cleaning frequency or the like or combination thereof. The controller 31 then passes the received print data to the printer engine 36, and controls the printer engine 36 to print based on the print data on the print medium specified by the received media selection information (step S230). In other words, by working together, the controller 31 and printer engine 36 function as a printing process unit that prints, on the print medium, based on the print data using the settings defined in the print settings information SI.

The controller 31 may receive print data including print mode selection information from the image processing device 20. When print data including print mode selection information is received, the controller 31 controls the printer engine 36 to print in the print mode specified by the print mode selection information. For example, the controller 31 controls the operation of the carriage and the conveyance timing of the conveyance mechanism of the printer engine 36 according to the number of passes in the print mode specified by the print mode selection information. As a result, printing is completed by the printer 30 specified by the user on the print medium specified by the user.

4. Example 2

A second example of the invention is described next. Note that the second and further examples are described below focusing on the differences with the examples described previously.

The printer 30 of the first example described above has storage 32 that stores the print settings information SI required for the printing process, but the printer 30 according to the second example of the invention does not locally store the print settings information SI. More specifically, in the second example, the print manager device 10 does not store, in the corresponding printers 30, the print settings information SI of the media files MF stored in the storage 12 relationally to the managed printers 30. Therefore, in the second example, the printers 30 do not store a print settings information table 320, and there is no need to synchronize the print settings information SI stored by the print manager device 10 with print settings information SI stored by the printers 30. In the second example, there may be no need to conceptually divide the storage 12 of the print manager device 10 into a first storage area (first media registration list 165) and second storage area (second media registration list 166). In any event, for each managed printer 30, the controller 11 can assign media numbers identifying the print media each printer 30 can use, and store the media numbers in the storage 12. Also in the second example, the print manager device 10 can detect user operations and edit the print settings information SI stored in the storage 12. The storage 12 may be conceptually divided, however, in the event that edits are maintained separately.

Figure 10:
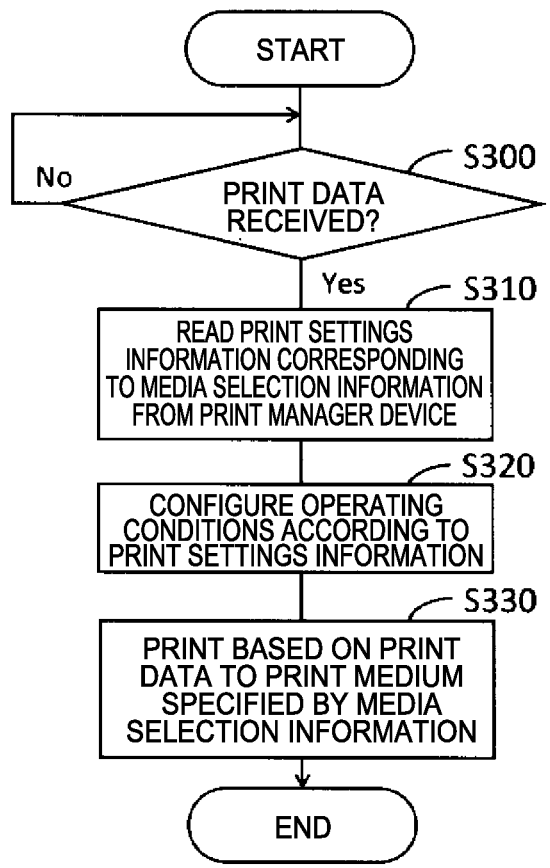
FIG. 10 is an example flow chart of a printing process of the printer according to the second example of the invention.

FIG. 10 is a flow chart of the printing process the controller 31 of the printer 30 executes according to firmware FW.

Step S300 is the same as step S200 (FIG. 9). In step S310, the controller 31 acquires the media selection information received with the print data, and acquires the print settings information SI corresponding to the media selection information from the print manager device 10. In this event, the controller 31 sends, through the communication interface 35 to the print manager device 10, a request for the print settings information SI together with the media selection information received with the print data in step S300.

When the request signal is received, the controller 11 of the print manager device 10 reads the print settings information SI of the media file MF corresponding to the media selection information received with the request signal, from the media files MF stored in the storage 12 relationally to the printer 30 that sent the request signal. The controller 11 then sends the read print settings information SI to the printer 30 that sent the request signal. As a result, the controller 31 of the printer 30 can acquire the print settings information SI corresponding to the print medium specified by the media selection information.

In step S320, the controller 31 sets the operating conditions for parts of the printer engine 36 according to the print settings information SI acquired from the print manager device 10 in step S310. Step S330 is the same as step S230 (FIG. 9).

The second example thus enables the printer 30 to acquire the print settings information SI required for the printing process based on the received print data, even without having a print settings information table 320, each time print data and media selection information are received from the image processing device 20 by acquiring the print settings information SI corresponding to the print medium specified by the media selection information from the print manager device 10.

5. Example 3

The third example differs from the first and second examples in that the image processing device 20 stores an image processing information table 220 (FIG. 1) in the storage 22.

The print manager device 10 stores the image processing information PI of each media file MF stored in the storage 12 relationally to each managed printer 30 in the image processing device 20. In other words, the image processing device 20 has storage 22 for storing the image processing information PI the print manager device 10 stores, and the storage 22 has an image processing information table 220 for storing the image processing information PI acquired from the print manager device 10.

In this example, the controller 11 sends, through the communication interface 15 to the image processing device 20, the image processing information PI of each media file MF stored in the storage 12 (second storage area) relationally to each managed printer 30, together with the media information MI of the corresponding media file MF, and the printer identifier of the corresponding printer 30.

FIG. 11 shows an example of the image processing information table 220 stored in the image processing device 20. The image processing device 20 stores, in the image processing information table 220 of the storage 22, the combination of printer identifier, media information MI related to the printer identifier, and the image processing information PI that was sent from the print manager device 10. The image processing information table 220, more specifically, stores the information contained in the media table MT (FIG. 2) of the print manager device 10 minus the print settings information SI.

When a media file MF is added to or modified in a media file MF (media table MT) stored in the storage 12 relationally to a managed printer 30, the controller 11 immediately sends the information that was added to or modified in the media file MF (media information MI, image processing information PI) to the image processing device 20, and updates the content of the image processing information table 220 according to the information that was sent.

Figure 12:
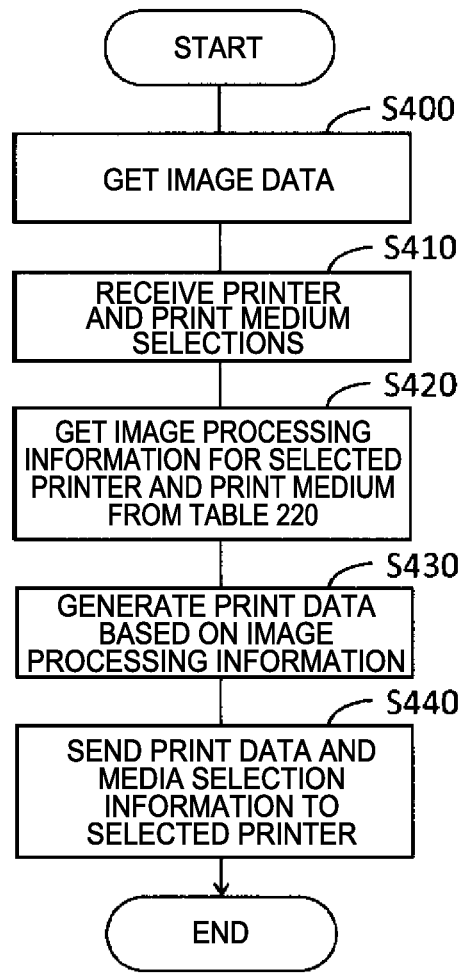
FIG. 12 is an example flow chart of the print data generating process of the image processing device according to a third example of the invention.

FIG. 12 is a flow chart of the print data generating process embodied by or performed by the controller 21 of the image processing device 20 executing the image processing program 26 in this third example of the invention.

Step S400 is the same as step S100 (FIG. 8).

Step S410 is basically the same as step S110 (FIG. 8), and the controller 21 receives the selections of the printer 30 to execute the printing process and the print medium to use for printing. In this third example, however, the controller 21 does not need to query the print manager device 10 in step S410 for the managed printers 30 and the print media each printer 30 can use. Based on the information contained in the image processing information table 220 stored in the storage 22, the controller 21 generates and displays on the display 23 the print conditions input interface described above.

When the printer and print medium selections are received, the image processing device 20 reads the image processing information PI related to the selected printer 30 and print medium from the image processing information table 220 (step S420). In other words, in this third example, because the image processing device 20 stores an image processing information table 220, the image processing information PI required to generate print data can be acquired without accessing the print manager device 10 each time print data is generated.

Next, the controller 21, based on the image processing information PI acquired from the image processing information table 220, generates print data for the print medium specified in step S410 (step S430). In this third example, the controller 21 can, of course, display on the display 23 a user interface enabling the user to select the print mode, and generate print data based on the image processing information PI corresponding to the selected print mode. Step S440 is the same as step S140 (FIG. 8).

The configuration and processes of the printer 30 described in the first example or second example can be applied to the third example. In other words, the printer 30 receiving print data and media selection information from the image processing device 20 having an image processing information table 220 may have a print settings information table 320 as described in the first example, or access a print settings information table 320 as described in the second example.

6. Summary

In the examples described above, the print manager device 10 includes a media print information storage unit (storage 12) that stores, for each managed printer 30, media print information (a media file MF for each print medium). The print information may be information relating the image processing information PI required to generate print data for specific print media and print settings information SI required for printing on the same print media. The print manager device 10 can send the image processing information PI stored in the storage 12 relationally to the print medium specified by media selection information to the image processing device 20. Based on the image processing information PI acquired from the print manager device 10, the image processing device 20 generates print data for the print medium specified by the media selection information, and sends the media selection information and generated print data to the printer 30. The printer 30 receives the media selection information, and the print data generated by the image processing device 20 for the print medium specified by the media selection information.

The print manager device 10 can send the print settings information SI stored in the storage 12 to the printer 30. The print manager device 10 sends the print settings information SI stored in the storage 12 relationally to the print medium specified by the media selection information to the printer 30.

Note that when executing the printing process based on the print data, the printer 30 may acquire the print settings information SI from a print settings information table 320 stored by the printer 30, but the print settings information SI stored in the print settings information table 320 is the print settings information SI sent from the print manager device 10. Therefore, the print manager device 10 in the first example can be said to send the print settings information SI stored in the storage 12 to the printer 30 in advance. The printer 30 prints based on the received print data according to the print settings information SI acquired from the print manager device 10 (such as through the print settings information table 320).

In other words, the image processing device 20 generates print data based on image processing information PI corresponding to the print medium specified by the media selection information, and the printer 30 prints based on the print data using the settings defined in the print settings information SI corresponding to the print medium specified by the media selection information. As a result, a mismatch between the image processing information PI used by the image processing device 20 to generate the print data, and the print settings information SI used by the printer 30 to print based on the print data (a mismatch between the corresponding print media) does not occur, and printouts with good print quality can be produced. Embodiments of the invention allow print data to be generated in the context of a specific print media and allow the generated print data to be printed on the print media (or print medium) for which the print data was prepared.

More specifically, the effect of embodiments of the invention is particularly great in a configuration in which a RIP device (image processing device 20) generates print data that is precisely color matched to the characteristics of the print medium by color matching using an ICC profile, for example, and an LFP (printer 30) configures precise print settings (such as the heater temperature and platen gap) corresponding to the specific print medium before printing to output a high quality printout based on the print data. If the print medium for which the print data is generated differs from the print medium targeted by the print settings of the printer 30, the print data and print settings are not optimally matched. As a result, a printout with the high quality expected by the user cannot be obtained. However, the examples described above reliably prevent such a print media mismatch, and a printout with the high quality expected by the user can be obtained.

Like the image processing information PI, the print settings information SI in the media file MF may be grouped according to the print mode. More specifically, in the media file MF corresponding to a single print medium, optimized image processing information PI and print settings information SI may be stored relationally to specific print modes 1, 2, 3, and so forth. The media print information storage unit (storage 12) may therefore be said to store image processing information PI and print settings information SI relationally to each printer 30, to each print medium usable by a printer 30, and/or to each print mode usable for printing. In this configuration, print settings information SI for each print medium and for each print mode can be sent from the print manager device 10 to the printer 30. As a result, when print data containing print mode selection information is received, the controller 31 of the printer 30 sets the operating conditions for parts of the printer engine 36 and prints according to the print settings information SI appropriate to the media selection information and the print mode specified by the print mode selection information.

7. Other Examples

The print manager device 10 may be embodied by a cloud server, and the image processing device 20 and printer 30 may communicate through the Internet 50, which is a public telecommunication network. The communications discussed herein may occur over one or more networks.

Figure 13:
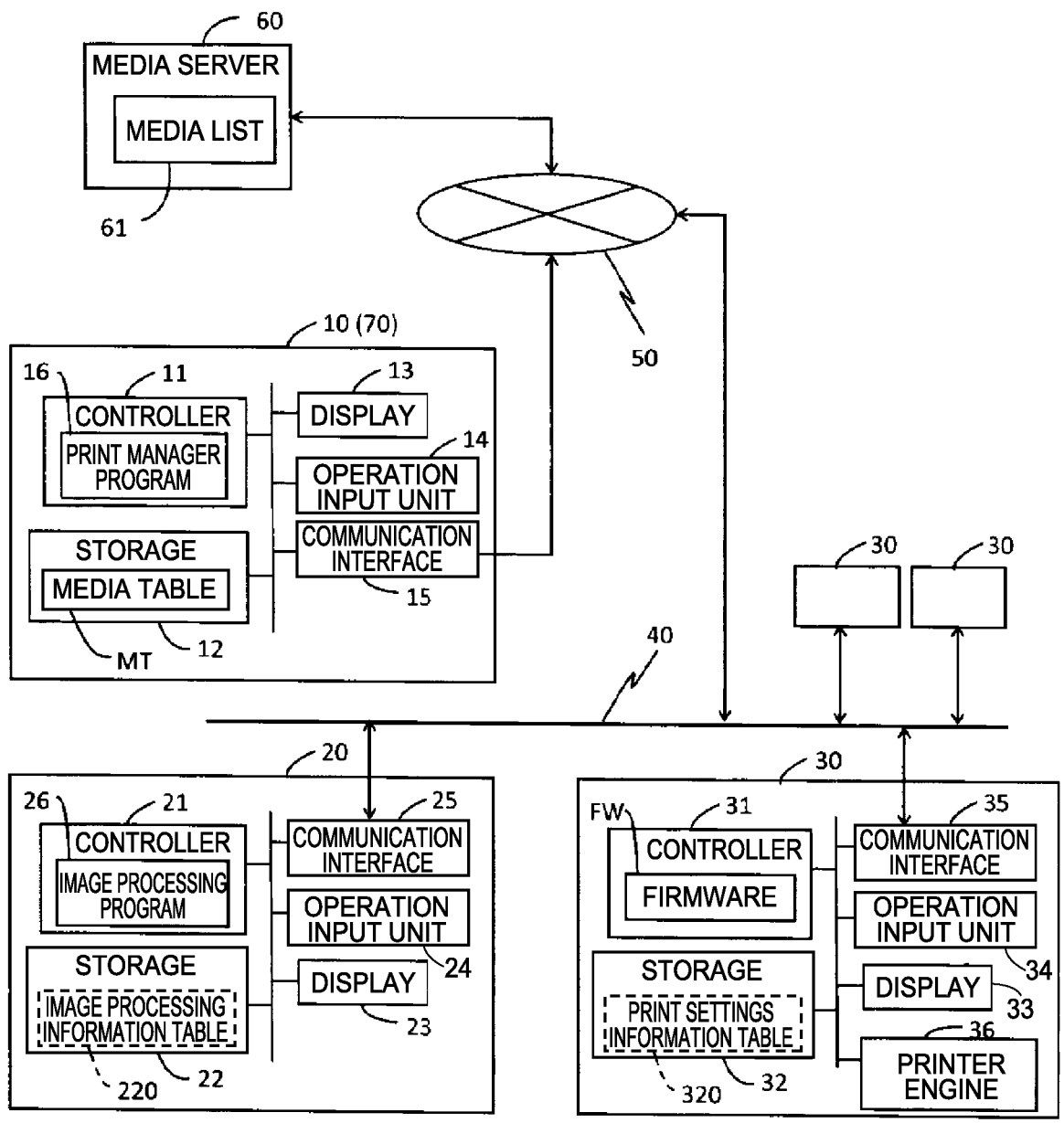
FIG. 13 is a block diagram of the configuration another example of another print processing system.

FIG. 13 is a block diagram illustrating another configuration of the system 1. The system 1 in FIG. 13 differs from that in FIG. 1 in that the print manager device 10 is embodied by a cloud server 70 connected to the Internet 50. Like the media server 60, the cloud server 70 may be configured as part of a cloud computing environment (virtual server) that provides a cloud service through the Internet 50, or as a physical server. The media server 60 may be included in the category of a system 1. The cloud server 70 and media server 60 may also be a common server. The media server 60 and the cloud server 70 may be integrated. In this configuration, the storage 12 storing the media table MT is stored on the cloud server 70 embodying the print manager device 10. As a result, if the image processing device 20 and printer 30 are connected to the Internet 50, required information, such as the image processing information PI and print settings information SI, can be acquired from the cloud server 70 when needed. The image processing device 20 and printer 30 are therefore not required to store an image processing information table 220 or print settings information table 320.

This configuration also simplifies the process of providing common print settings information SI to multiple printers 30 connected to the Internet 50, and the integrity of the print settings information SI can be protected even if a problem occurs on a printer 30 storing print settings information SI.

The image processing program 26 of the image processing device 20 is not limited to RIP software, and may function as a printer driver that generates print data and controls the printer 30 to print based on the print data.

Functions embodied as software above may also be embodied by hardware.

The media list 61 of the media server 60 may also be distributed to users recorded on a computer-readable, removable memory device or optical disc, for example.

Figure 14:
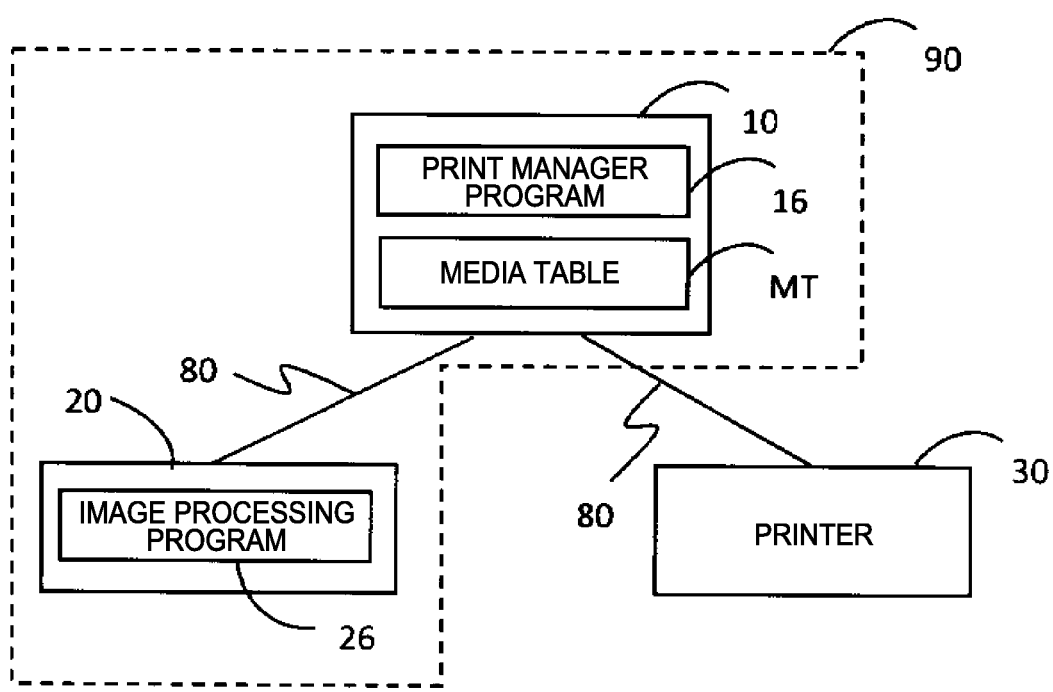
FIG. 14 is a block diagram of the configuration another example of yet another print processing system.

FIG. 14 is a block diagram illustrating another configuration of the system 1. The system 1 in FIG. 14 shows the print manager device 10 connected to the image processing device 20 and printer 30, while the internal configuration of each is omitted.

In FIG. 1 and FIG. 13, the printer 30 is a network printer connected through the communication interface 35 to the LAN 40, and shared by multiple terminals (image processing devices 20, for example). As shown in FIG. 14, however, the printer 30 is not limited to a network printer configuration, and may be connected directly (locally) through a cable 80, for example, to the print manager device 10. The image processing device 20 is also not limited to the configuration described above, and may be connected directly (locally) through a cable 80, for example, to the print manager device 10. The security of the printer 30 and image processing device 20 is improved by using a direct, local connection. The print manager device 10 in this configuration may be connected to the Internet 50 as described above, or may be isolated from the Internet 50 while storing the media table MT, which stores the media files MF for each print medium required by the image processing device 20 and printer 30.

In the configuration shown in FIG. 14, the image processing device 20 may send print data and other information to be sent to the printer 30 to the print manager device 10, and the printer 30 can receive the print data and other information sent from the image processing device 20 from (through) the print manager device 10.

As indicated by the dotted line in FIG. 14, the print manager device 10 and image processing device 20 may share the same housing 90. In this configuration, the print manager device 10 includes the image processing device 20 indicated by the solid line. The print manager device 10 therefore stores both the print manager program 16 and image processing program 26. The printer 30 is connected through a cable 80, for example, to the print manager device 10 including the image processing device 20. Alternatively, the print manager device 10 including the image processing device 20 may communicate with the printer 30 through the Internet 50. The local connections between the print manager device 10, image processing device 20, and printer 30 are also not limited to a wired (cable 80) connection, and may communicate directly wirelessly in an ad hoc mode.

Embodiments of the invention being thus described, it will be obvious that it may be varied in many ways. Such variations are not to be regarded as a departure from the spirit and scope of the invention, and all such modifications as would be obvious to one skilled in the art are included within the scope of the following claims.

What is claimed is:

1. A print manager device comprising:
a media print information storage storing media print information, wherein the media print information includes information relating to image processing information used to generate print data for a specific print medium and print settings information used to print on the print medium, wherein the media print information is relationally stored to each printer configured to print based on the print data according to the print settings information; and
a processor that is configured to control communication, wherein the processor is configured to:
receive printer selection information selecting a printer and media selection information selecting a print medium from an image processing device,
retrieve image processing information and print setting information relational to the selected printer and the selected print media stored in the media print information storage,
send the image processing information to the image processing device to cause the image processing device to generate print data using the image processing information, and
send the print settings information to the selected printer,
wherein the media print information storage stores the image processing information and the print settings information relationally to each printer and to each print medium the printer can use.

2. The print manager device according to claim 1, wherein:
the processor, when the media selection information and the printer selection information specifying a printer are input from the image processing device, sends image processing information stored in the media print information storage relationally to the printer specified by the printer selection information and to the print medium specified by the media selection information, to the image processing device.

3. The print manager device according to claim 1, wherein:
the media print information storage stores the image processing information and the print settings information relationally to each printer, to each print medium the printer can use, and to each print mode that can be used for printing.

4. The print manager device according to claim 1, wherein:
the processor can access a specific server through a public telecommunication network, and can acquire, and store in the media print information storage, the desired media print information from among the media print information the server stores for each print medium.

5. The print manager device according to claim 1, wherein:
the print manager device includes a cloud server, and communicates through a public telecommunication network with the image processing device and printer.

6. The print manager device according to claim 1, wherein:
the processor stores the print settings information stored for each printer in the media print information storage in the corresponding printer.

7. The print manager device according to claim 1, wherein:
the processor synchronizes the print settings information stored for each printer in the media print information storage, and the print settings information stored on each printer.

8. The print manager device according to claim 1, wherein:
the print settings information stored by the media print information storage includes edited print settings information.

9. The print manager device according to claim 1 wherein:
a first timing when the image processing information is sent to the image processing device, and a second timing when the print settings information is sent to the printer, are different.

10. The print manager device described in claim 9, wherein:
the second timing is more frequent than the first timing.

11. A printer comprising:
a processor that controls communication; and
a print processing unit that prints print data using settings defined by print settings information used to print on a print medium;
the processor is configured to
  acquire media selection information specifying a print medium, and print data generated for the print medium specified by the media selection information from an image processing device, the image processing device configured to
    receive printer selection information selecting the printer and media selection information selecting a print medium from a user,
    pass the received printer selection information and media selection information to a print manager device that is caused to retrieve image processing information and print setting information relational to the media selection information and the printer stored in a media print information storage,
    receive the image processing information from the print manager device, and
    generate print data using the image processing information received from the print manager device, and
  acquire the print settings information corresponding to the print medium specified by the media selection information from the print manager device; and
the print processing unit is configured to print using the settings defined by the acquired print settings information.

12. The printer according to claim 11, further comprising:
a print settings information storage that stores the print settings information stored by an external management device;
the print processing unit is configured to acquire the print settings information corresponding to the print medium specified by the media selection information from the print settings information storage, and is configured to print based on the received print data using the settings in the acquired print settings information.

13. The printer according to claim 11, further comprising:
an editing unit that receives edits to the print settings information;
the editing unit is configured to update the print settings information stored by the print settings information storage according to the edited print settings information.

14. The printer according to claim 13, wherein:
the processor synchronizes the print settings information stored by the management device, and the print settings information stored in the print settings information storage.

15. A print manager device comprising:
a media print information storage storing media print information, wherein the media print information includes information relating to image processing information used to generate print data for a specific print medium and print settings information used to print on the print medium, wherein the media print information is relationally stored to each printer configured to print based on the print data according to the print settings information; and
a processor that is configured to control communication, wherein the processor is configured to:
  receive printer selection information selecting a printer and media selection information selecting a print medium from an image processing device,
  retrieve image processing information and print settings information relational to the selected printer and the selected print media stored in the media print information storage,
  send the image processing information to the image processing device to cause the image processing device to generate print data using the image processing information, and
  send the print settings information to the printer,
  wherein a first timing when the image processing information is sent to the image processing device, and a second timing when the print settings information is sent to the printer, are different, and the second timing is more frequent than the first timing.

* * * * *